March 31, 1959 M. SKOBEL 2,879,584
METHOD OF ENCAPSULATING TRANSFORMERS AND OTHER ELECTRICAL UNITS
Filed March 4, 1952 2 Sheets-Sheet 1
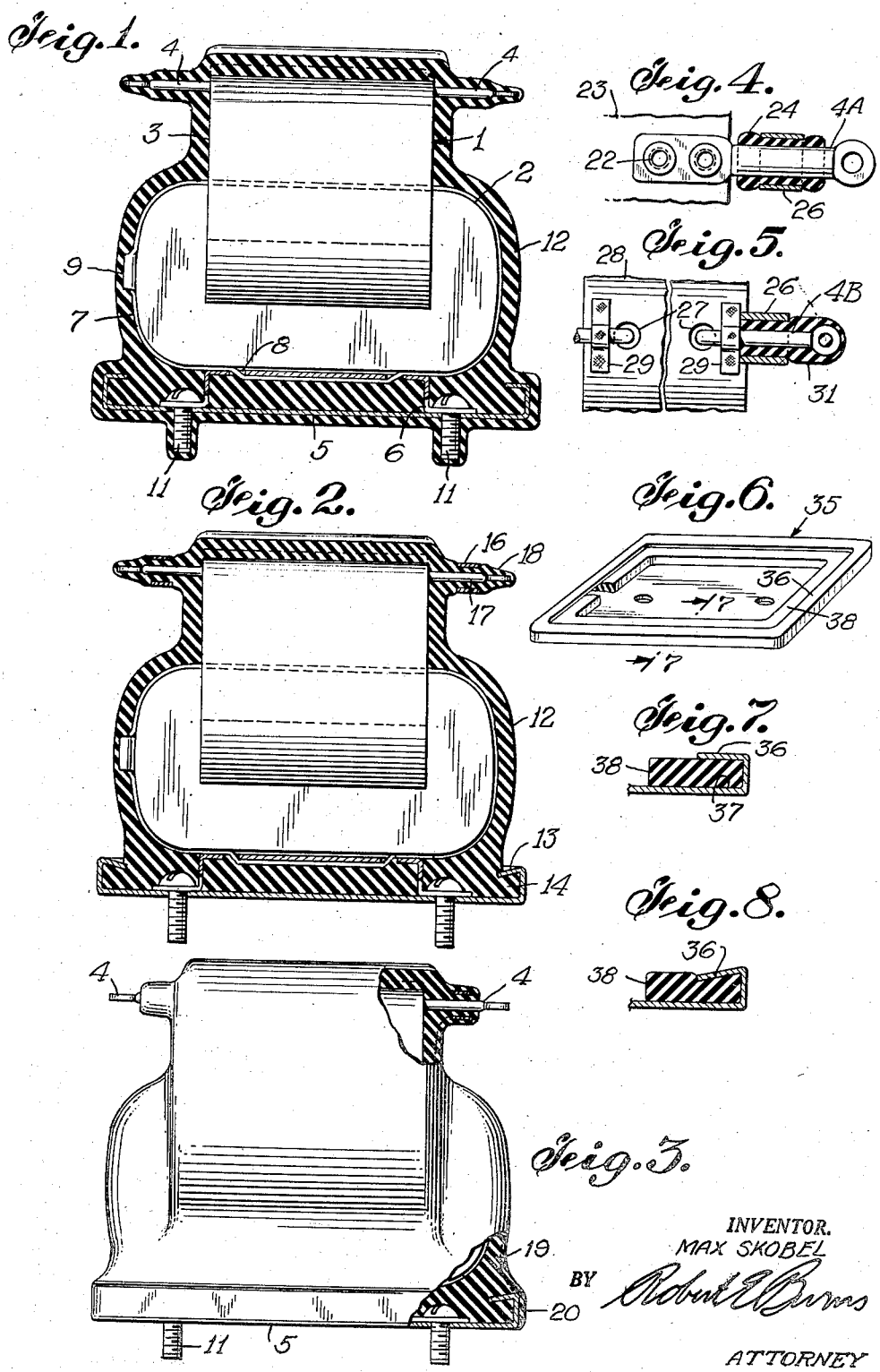
INVENTOR.
MAX SKOBEL
BY
ATTORNEY

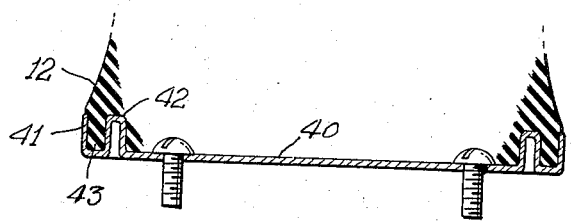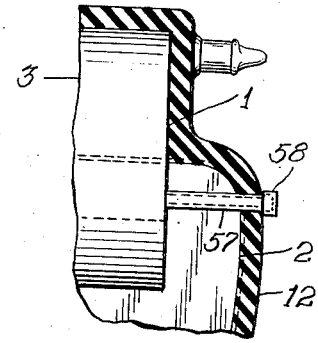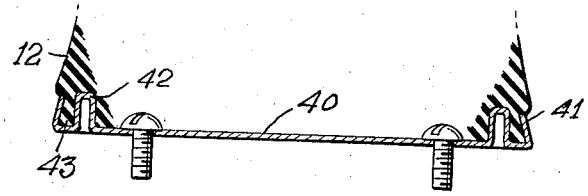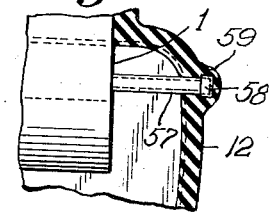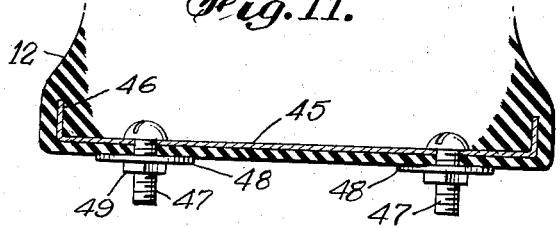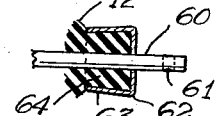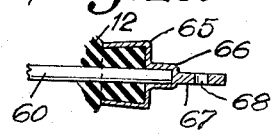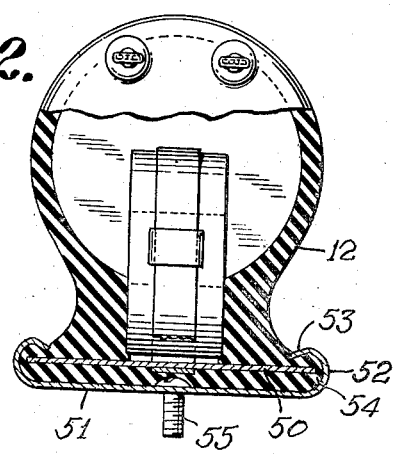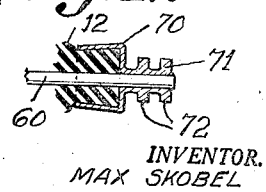

United States Patent Office 2,879,584
Patented Mar. 31, 1959

2,879,584

METHOD OF ENCAPSULATING TRANSFORMERS AND OTHER ELECTRICAL UNITS

Max Skobel, Elberon, N.J.

Application March 4, 1952, Serial No. 274,790

3 Claims. (Cl. 29—155.56)

The present invention relates to encapsulating electrical units to protect them from moisture or other fluids or liquids which might have a deleterious effect on the insulation or other properties of the units. Although it is not limited to such applications, the invention is particularly applicable to transformers, coils, windings, relays, transistors, condensers and resistors. The invention is particularly beneficial where such units include insulation or other portions that are susceptible to moisture.

Many attempts have heretofore been made to hermetically seal such electrical units in various ways. They have, for example, been sealed inside metal cans, but this is a relatively difficult and expensive construction involving the problem of bringing leads out through the can while preserving a tight seal. It has also been proposed to enclose some units in glass tubes, but such enclosure is expensive and the tubes are susceptible to breakage. A further proposal has been to place the unit in a mold and a mold plastic material, for example a phenolic resin, around it. This is likewise expensive, requiring a special mold for each type and size of units. Others have attempted to seal such units by coating them with varnish and various other materials but such attempts have not been successful in achieving a satisfactory hermetic seal of the units.

There are several factors that render the problem of sealing such units especially difficult. The units must ordinarily be capable of withstanding wide ranges of temperature, for example from —65° centigrade to 135° centigrade. Some coating materials become brittle at low temperature and some will not stand high temperatures. Moreover, the variation in temperature produces expansion and contraction of the materials. Because of different coefficients of expansion, the coating material tends to crack and to separate from the underlying surface of the unit. A variation of temperature also produces a corresponding variation in the pressure of air entrapped inside the coating with the result that the unit tends to breathe, thereby drawing in moist air from the outside. A further difficulty arises from the fact that such units ordinarily have terminals, binding posts, bases, mounting posts, or studs, etc., which extend outside the protective covering and constitute weak spots in the encapsulation. Hence, moisture may gradually seep in around these projecting parts and eventually affect the insulation of the units.

It is an object of the present invention to overcome the foregoing difficulties and provide an inexpensive and highly effective method of encapsulating electrical units to protect them from air, moisture, water and other deleterious liquids, gases or vapors. In accordance with the invention, the unit is totally enclosed, except for projecting terminals and mounting elements, in a tough, pliable elastic hide of elastomer material which is sufficiently thick to be strong and self-sustaining even if separated from the surface of the unit. The material is sufficiently resilient and sufficiently thick to be soft to the touch, having, for example, a durometer of 30 to 70. It is stretchable without tearing and will hence accommodate itself to any expansion or contraction of the unit or of air or other fluid inside the unit without rupturing. Around all portions, such as terminals, mounting elements, etc., that extend outside the covering, means is provided for compressing an annular portion of the elastomer material and for holding it under pressure to prevent moisture, liquid or gases from seeping in around the projecting parts. This has been found to provide an effective and permanent hermetic seal.

Other objects, characteristics and advantages of the invention will be apparent from the following description and claims and from the accompanying drawings, in which:

Fig. 1 is a longitudinal section of a transformer representing one step of the method of encapsulating an electrical unit in accordance with the present invention.

Fig. 2 is a similar section showing a succeeding step.

Fig. 3 is a side elevation of the transformer after completion of the encapsulation, portions being broken away to show interior structure.

Figs. 4 and 5 are fragmentary top views—partly in section—showing two types of terminals and illustrating a step in the method of providing a tight seal around the terminals in accordance with a modified process.

Fig. 6 is a perspective view of a base for a transformer, illustrating a step in providing a tight seal around the edges of the base.

Fig. 7 is a fragmentary section taken approximately on the line 7—7 in Fig. 6.

Fig. 8 is a similar section illustrating a succeeding step in the method.

Figs. 9, 10 and 11 are sections illustrating other forms of bases.

Fig. 12 is an end view, partly in cross-section, of a transformer similar to that shown in Figs. 1 to 3 but with a different type of base.

Fig. 13 is a partial longitudinal section of a transformer, illustrating a method of filling the transformer with oil or other insulating liquid after the protective covering has been applied.

Fig. 14 is a similar section showing a succeeding step in the process.

Figs. 15, 16 and 17 are fragmentary sections showing different types of terminals.

While the invention is applicable to many different types of electrical units, the drawings illustrate, by way of example, a method of encapsulating a transformer suitable for use in electronic equipment. As shown in Fig. 1, the transformer 1 comprises a laminated core 2 and a winding 3 having a plurality of terminals 4. The winding 3 may, for example, comprise successive coils or layers of wire separated by intervening layers of paper or other insulating material. The ends of the various windings are electrically connected, for example by solder, to the terminals 4 which may be of any desired number, depending on the number and type of winding. The terminals 4 are usually formed of heavier wire which is suitably anchored to the winding or coil of the transformer and project outwardly for electrical connection to circuits in which the transformer is used. Two types of terminals are shown in Figs. 4 and 5 and described more fully below. The transformer is provided with a base 5 on which it is mounted by means of a bracket 6 and a metal band 7 which extends around the core 2 and through slots 8 in the bracket 6, the ends of the band being secured together by a soldered clamp 9. The bracket 6 is secured to the base by threaded studs 11 which project through the base and provide means for mounting the transformer on a suitable chassis, or elsewhere, as desired. The studs 11 are brazed, soldered or otherwise secured to the base in such manner as to provide a fluidtight seal around the studs.

In accordance with the method illustrated in Figs. 1 to 3, the transformer 1 is covered with a relatively thick coating 12 of a fluid thixatropic polymerizable elastomer material having the property of polymerizing into a tough, yieldable, elastic hide. A suitable composition of the material is as follows:

*Compound #1*

100 parts (by weight) of a polysulfid liquid polymer,
40 parts ZnS, or other non-conductive pigment or filler,
1 part stearic acid, or other inhibitor,
0.1 part rubber maker's sulphur.

*Compound #2*

50 parts (by weight) $PbO_2$,
45 parts dibutylphthalate,
5 parts stearic acid.

The two Compounds #1 and #2 are stored separately and are mixed prior to use, approximately 140 parts of Compound #1 being mixed with approximately 20 parts of Compound #2. After mixing, the compounds can be used for approximately eight hours at room temperature. The amounts of stearic acid and sulphur in the compound are rather critical. The other amounts, including the amount of Compound #2, may be varied within reasonable limits, for example plus or minus 5%. The dibutylphthalate serves as an agent for mixing in the lead peroxide. The amount used is not critical and other suitable mixing agents may be used if desired.

A suitable liquid polymer is that known commercially as "Thiokol" liquid polymer LP-2 having an average structure as follows:

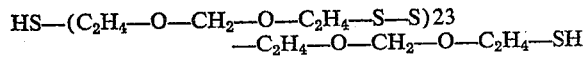

Occasionally, in the chain of recurring units, there is a side mercaptan group. This material is amber in color and is a thick, viscous liquid having a viscosity of about 400 poises at 25° centigrade, a specific gravity of about 1.27 and a molecular weight of approximately 4000.

The polymerizable elastomer compound is applied to the transformer in any desired manner. A convenient method is to dip the entire transformer into a bath of the composition at room temperature and room pressure, no vacuum being required. The transformer is preferably left in the bath several minutes to eliminate any air bubbles that may have formed on it. After dipping, the transformer is lifted out of the bath and allowed to drain. A relatively thick covering of the material adheres to the transformer. For example, on small units, the covering may have a thickness of 1/16 inch to 1/8 inch while, on larger units, for example a transformer approximately five inches long, the coating may be 1/8 inch to 3/16 inch thick. As will be seen in Fig. 1, the elastomer material covers the entire unit, including the terminals 4, base 5 and mounting studs 11.

After the polymerizable elastomer material has been applied to the unit, for example by spraying or blowing or by dipping, as described above, the material is polymerized by allowing it to cure at room temperature for about eight hours. The time required for polymerization can be shortened by applying heat, for example by means of infra-red lamps, but care must be exercised to avoid decreasing the viscosity of the material by the application of sufficient heat to cause it to flow and thereby reduce the thickness of the covering, particularly on the upper portions of the unit. Especially during the initial portion of the polymerizing period, it is important to avoid fluctuations in temperature or air pressure that would cause bubbles in the material.

After the elastomer material has been polymerized, it is trimmed from the bottom and edge portions of the base 5, including a peripheral portion 13 which is flanged and turned inwardly to provide a peripheral channel 14, as illustrated in Fig. 2. The elastomer material can be peeled without difficulty from the metal base. However, if desired, the bottom of the base may be polished or plated to provide a smooth finish, or may be coated with a suitable lubricant, such as a silicon grease, to make separation of the elastomer material from the base still easier. After the material has been trimmed, the inturned flange portion 13 of the base is crimped or pressed downwardly, as illustrated in Fig. 2, in order to compress and confine the elastomer material filling the channel 14. This provides a pressure seal around the entire peripheral edge of the base.

A similar pressure seal is provided around the terminals 4 by means of metal or other bands 16 which are shrunk or crimped on around the terminals so as to confine and compress an annular portion 17 of the elastomer material around the terminals. A pressure seal is thereby provided around each terminal.

After the bands 16 have been applied, the portion of elastomer material 18 covering the ends of the terminals may be removed and the transformer used in that condition. However, it is preferred to re-dip the transformer in the polymerizable material described above in order to provide a further coating, as indicated by the dotted line 19 in Fig. 3. This second coating covers the entire unit, including the flanged edge portions of the base and the bands 16 surrounding the terminals. After the second coating has been polymerized, as described above with reference to the initial coating, the elastomer material is cleared from the end portions of the terminals 4 while leaving the bands 16 completely covered. It is also preferably removed from the bottom of the base 5 and from the mounting studs 11 but is left on the flanged periphery of the base, as indicated at 20. The completed unit is shown in Fig. 3.

Figs. 4 to 8 illustrate a preferred method in accordance with the invention in which pressure seals are obtained by the use of pre-formed portions of elastomer material. In Fig. 4, there is shown a terminal 4A which is secured by means of hollow rivets 22 to a portion 23 of the insulating covering of the transformer coil or winding. An end of the winding is electrically connected to the terminal, for example by one of the rivets 22 or by soldering. Either before or after the terminal 4A is assembled with the winding, a tubular section of elastomer material 24 is applied to the terminal. The elastomer material 24 may be molded in place or may be a section of tubing which is slipped onto the terminal and fits tightly on it. After the tubular section 24 of elastomer material has been applied to the terminal, a band 26 of metal or other suitable material is crimped or shrunk on the tubular section of elastomer material so as to confine and compress an annular portion of said material. However, the length of the band 26 is less than that of the tubular section 24 so that end portions of the elastomer material remain exposed.

In Fig. 5, there is shown another type of terminal 4B which is assembled with the coil of the transformer by passing through holes 27 in an insulating covering 28 and being held in place by pieces of adhesive tape 29. Before the terminal is assembled, the outer end portion is covered with elastomer material 31 which may be molded on or applied by dipping. An annular portion of this material is compressed around the material by means of a band 26, as in Fig. 4.

In Fig. 6, there is shown a base 35 which may be similar, or identical with, the base 5 of Figs. 1 to 3. The periphery of the base 35 is bent up and inwardly to form an inturned flange 36 and a peripheral channel 37. A pre-formed strip or ring 38 of elastomer material is positioned in the channel 37, substantially filling the channel and projecting inwardly beyond the inner edge of the flange 36. This is preferably done before the transformer is mounted on the base. After the ring of elastomer material 38 has been placed in position, the inwardly projecting flange 36 of the base is pressed or crimped downwardly, as illustrated in Fig. 8, so as to contain and compress the portion of the elastomer material 38 in the channel 37.

The steps described above in connection with Figs. 4 to 8 provide pre-formed pressure seals around the terminals and around the periphery of the base 35. Assembly of the transformer and base is then completed, the transformer being suitably mounted on the base, for example as illustrated in Fig. 1. The assembled unit is then coated with thixotropic polymerizable elastomer material, for example by dipping, as described above, and said material is polymerized. The elastomer material thus applied covers the band 26 (Figs. 4 and 5) surrounding the terminals and bonds with the exposed portions of the elastomer material 24 or 31 surrounding the terminals. It also covers the flange 36 of the base and bonds with the exposed portion of the elastomer material 38 so as to form an integral structure. The elastomer material is cleared from the end portions of the terminals and from the bottom of the base 35. The completed transformer is essentially identical in appearance with that shown in Fig. 3. The method described in conjunction with Figs. 4 to 8 has the advantage that the portions of elastomer material 24 and 31 and the compressing bands 26 are easily applied prior to assembly of the terminals with the transformer. Likewise, the ring 38 of elastomer material is easily positioned in the channel of the base and the flange 36 of the base may be easily pressed downwardly, for example by means of a suitable press or die. There is the further advantage that the portions of elastomer material 24, 31 and 38, which provide a pressure seal, may be different from the elastomer material forming the covering 12 of the transformer. For example, the portions 24, 31 and 38 may be formed of material such as Buna-S rubber or "neoprene" having good resistance to cold flow while the covering 12 is formed of material selected for its inertness and toughness.

Figs. 9 and 10 illustrate an alternative base 40 formed with a peripheral flange 41 and a reentrant rib portion 42 which parallels the flange to provide a peripheral channel 43. After the unit has been coated with elastomer material 12, said material filling the channel 43, and, after excess elastomer material has been cleared from the bottom of the base and from the outside of the flange 41, the flange is crimped inwardly, as illustrated in Fig. 10, to contain and compress the elastomer material in the channel 43, thereby providing a pressure seal around the entire periphery of the base. Alternatively, a pre-formed ring of elastomer material may be inserted in the channel 43, as described in connection with Figs. 6 to 8, but it is easier to use the simpler form of channel shown in the latter figures. Fig. 11 illustrates a further way in which a pressure seal may be obtained. As illustrated in this figure, the base 45 has a peripheral flange 46 and mounting studs 47. After the entire unit has been covered with a thick coating of elastomer material, as described above, said material is cleared from the mounting studs 47 but is left on the bottom of the base. Washers or plates 48 are then placed over the studs 47 and are pressed against the elastomer material 12 by nuts 49 to compress annular portions of said material between the washers 48 and the base 45 around each of the studs 47, thereby providing a pressure seal. Instead of separate washers 48, a single bottom plate may be used having holes fitting over all of the studs 47.

In Fig. 12, there is shown a unit substantially the same as that of Fig. 1, except that the transformer is mounted on a flat base 50 the peripheral edge of which is preferably rounded or beaded so as to avoid sharp edges. After the unit has been covered with elastomer material, for example as described above, but without removing the material from the bottom of the base 50, a bottom plate 51 is applied to the coated base 50 and the peripheral portion 52 of the plate 51 is curved upwardly and inwardly, as shown, to provide an inwardly projecting flange 53 and form a peripheral channel 54 embracing the covered peripheral edge portion of the base 50. The inwardly projecting flange 53 is preferably pressed downwardly so as to confine and compress the elastomer material contained in the channel 54, thereby providing a firm mechanical connection between the bottom plate 51 and the base. As the elastomer material covers the entire base 50, including the bottom and edges, a hermetic seal is provided. The bottom plate 50 is shown as having studs 55 for mounting the unit.

In Figs. 13 and 14, there is illustrated a method of filling the transformer or other electrical unit with an insulating liquid, such as oil, after the unit has been encapsulated in elastomer material. The transformer 1, which may otherwise be the same as that illustrated in Fig. 1, is provided with a tube 57 which extends inwardly to the inner portion of the transformer and projects outwardly beyond the core 2. The outer end of the tube 57 is closed by a removable cap 58. After the unit has been covered with elastomer material, for example as described above, the material is cleared away from the cap 58 and the cap is removed. The transformer is then filled with oil, for example by immersing it in an oil bath, subjecting it to a vacuum to remove the air and then removing the vacuum to allow the oil to flow in. The cap 58 is then replaced and is covered with a portion of elastomer material 59. If the unit is to be redipped, as described in connection with Fig. 3, the cap 58 will be covered in the redipping process. Otherwise, it may be covered with polymerizable elastomer material which will bond with the material of the main covering 12 and become integral with it.

While the tube 57 is convenient for filling the transformer with oil, it is not in all cases essential since the oil may be otherwise introduced, for example through a hollow needle piercing the covering 12 of elastomer material, the resulting hole in the covering being later sealed.

Figs. 15 to 17 illustrate alternative types of terminals that may be used. In Fig. 15, there is shown a plain wire terminal 60 having near its end a hole 61. A cup 62 slips over the terminal and has a flange portion 63 which surrounds a portion 64 of the elastomer material 12 covering the electrical unit. After the cup 62 has been slipped on, the flange 63 is crimped inwardly, as shown, to compress an annular portion of elastomer material surrounding the terminal 60, thereby providing a pressure seal.

The construction shown in Fig. 16 is similar, except that the cup-shaped metal member 65 has a smaller cup-shaped portion 66 which receives, and is soldered to, the terminal wire 60 and a flat projecting portion 67 provided with a hole 68. The cup-shaped member 65 is crimped on to provide a pressure seal, as in the construction shown in Fig. 15.

Fig. 17 shows another style of terminal in which a similar cup-shaped member 70 has an outwardly projecting sleeve portion 71 which receives, and is soldered to, the terminal wire 60. The sleeve portion 71 is provided with a pair of spaced annular flanges 72 providing grooves to receive a conductor of an external circuit. As in Figs. 15 and 16, the cup-shaped member 70 is crimped on to apply pressure to an annular portion of elastomer material surrounding the terminal 60, thereby providing a pressure seal around the terminal.

It will be understood that the individual features of the several embodiments are mutually interchangeable and that other modifications may be made within the scope of the appended claims, the invention being in no way limited to the specific forms shown in the drawings. Moreover, while the invention has been illustrated and described with reference to a transformer, it will be understood that it is equally applicable to other types of electrical units.

What I claim and desire to secure by Letters Patent is:

1. In a method of encapsulating an electrical unit of the type described having projecting terminals, the steps of surrounding each of said terminals with elastomer material, applying a constricting band around each terminal to confine and constrict an annular portion of the elastomer material and maintain said portion under pressure while leaving an integral portion of said material exposed, covering the unit including said bands and said exposed portions of said material with a layer of thixatropic, polymerizable, elastomer material having the property of bonding with the elastomer material surrounding the terminals and polymerizing said layer of material and effecting a bonding thereof to the first mentioned elastomer material.

2. In a method of encapsulating an electric unit of the type described having projecting terminals, the steps of surrounding each of said terminals with elastomer material having good resistance to cold flow, applying a constricting band around each terminal to confine and constrict an annular portion of said elastomer material and maintain said portion under pressure while leaving an integral portion of said elastomer material exposed, covering the unit including said bands and said exposed portions of said elastomer material with a layer of a second elastomer material which is polymerizable to form a tough elastic covering but is less resistant to cold flow than said first mentioned elastomer material and which has the further property of bonding with said first mentioned elastomer material and polymerizing said second elastomer material and effecting a bonding thereof to the first mentioned elastomer material.

3. In a method of encapsulating an electric unit of the type described having a sheet metal base, the steps of flanging the periphery of the base to provide a peripheral channel, filling said channel with elastomer material having good resistance to cold flow, crimping the peripheral portion of the base to apply pressure to the elastomer material in said channel while leaving an integral portion of said elastomer material exposed, covering the unit including the exposed portion of said elastomer material with a layer of a second elastomer material which is thixatropic and is polymerizable to form a tough elastic covering but is less resistant to cold flow than the first mentioned elastomer material and which has the further property of bonding with the first mentioned elastomer material and polymerizing said second elastomer material and effecting a bonding thereof to the first mentioned elastomer material.

References Cited in the file of this patent

UNITED STATES PATENTS

| | | |
|---|---|---|
| 1,832,804 | Bower | Nov. 17, 1931 |
| 1,995,150 | Kaplan | Mar. 19, 1935 |
| 2,149,827 | Andre | Mar. 7, 1939 |
| 2,163,798 | Mucher | June 27, 1939 |
| 2,213,209 | Lange et al. | Sept. 3, 1940 |
| 2,298,441 | Waterman | Oct. 13, 1942 |
| 2,332,376 | Haberberger | Oct. 19, 1943 |
| 2,464,029 | Ehrman | Mar. 8, 1949 |
| 2,459,018 | De Monte | Jan. 11, 1949 |
| 2,526,688 | Robinson et al. | Oct. 24, 1950 |
| 2,646,535 | Coggeshall et al. | July 21, 1953 |
| 2,743,308 | Bardsley | Apr. 24, 1956 |
| 2,743,400 | Bujan | Apr. 24, 1956 |

FOREIGN PATENTS

| | | |
|---|---|---|
| 578,240 | Great Britain | June 20, 1946 |

OTHER REFERENCES

"Something New in Rubber," Thiokol Corp., February 8, 1936.

Fettes et al.: "Polysulfide Polymers," Ind and Eng. Chem., vol 42, No. 11, November 1950, page 2222.